United States Patent [19]
Stuer

[11] Patent Number: 5,507,267
[45] Date of Patent: Apr. 16, 1996

[54] PROCESS AND APPARATUS FOR IMPROVED COMBUSTION OF FUELS WITH AIR

[76] Inventor: Willy Stuer, Christoph-Siebe-Strabe 4, D-4840 Rheda-Wiedenbruck, Germany

[21] Appl. No.: 187,198

[22] Filed: Jan. 25, 1994

Related U.S. Application Data

[63] Continuation-in-part of Ser. No. 635,189, Mar. 5, 1991, abandoned, and Ser. No. 859,511, Jun. 8, 1992, abandoned.

[30] Foreign Application Priority Data

Dec. 7, 1989 [DE] Germany ............... 39 40 513.3
Dec. 8, 1989 [DE] Germany ............... 39 40 654.7

[51] Int. Cl.⁶ ............................................. F02M 27/04
[52] U.S. Cl. ............................................. 123/537
[58] Field of Search ............... 123/536, 537, 123/538, 539, 306, 557, 1 A; 431/2; 422/140, 141

[56] References Cited

U.S. PATENT DOCUMENTS

| | | | |
|---|---|---|---|
| 3,597,668 | 8/1971 | Yoshimine . | |
| 3,635,200 | 1/1972 | Rundell et al. . | |
| 3,749,545 | 7/1973 | Velkoff . | |
| 3,805,492 | 4/1974 | King . | |
| 4,008,037 | 2/1977 | Hindin et al. | 431/2 |
| 4,023,544 | 5/1977 | Cole | 123/537 |
| 4,342,308 | 8/1982 | McCord | 123/557 |
| 4,429,665 | 2/1984 | Brown | 123/3 |
| 4,594,969 | 6/1986 | Przybylski | 123/536 |
| 4,715,325 | 12/1987 | Walker | 123/538 |
| 4,745,890 | 5/1988 | Wyczalek | 123/306 |
| 4,930,483 | 6/1990 | Jones | 123/538 |
| 4,959,155 | 9/1990 | Gomez . | |
| 5,013,450 | 5/1991 | Gomez . | |
| 5,044,346 | 9/1991 | Tada et al. | 123/536 |
| 5,044,347 | 9/1991 | Ulrich et al. | 123/538 |
| 5,059,217 | 10/1991 | Arroyo et al. | 123/1 A |
| 5,069,190 | 12/1991 | Richards | 123/538 |
| 5,069,191 | 12/1991 | Scouten | 123/538 |
| 5,148,794 | 9/1992 | Scouten | 123/538 |
| 5,154,153 | 10/1992 | MacGregor | 123/538 |
| 5,167,782 | 12/1992 | Marlow | 123/538 |

FOREIGN PATENT DOCUMENTS

| | | | |
|---|---|---|---|
| 0349663 | 7/1988 | European Pat. Off. . | |
| 2028887 | 10/1970 | France . | |
| 2325815 | 4/1977 | France . | |
| 2456163 | 8/1976 | Germany . | |
| 3337220 | 4/1985 | Germany . | |
| 60-219412 | 11/1985 | Japan . | |
| 60-259719 | 12/1985 | Japan . | |
| 0885586 | 11/1981 | U.S.S.R. | 123/537 |
| 1402697 | 6/1988 | U.S.S.R. | 123/537 |
| 1152957 | 5/1969 | United Kingdom . | |
| 2092668 | 8/1982 | United Kingdom . | |

OTHER PUBLICATIONS

"Rompps Chemie–Lexikon,"8 Auflage 1981, S. 1084.

*Primary Examiner*—Marguerite Macy
*Attorney, Agent, or Firm*—Tarolli, Sundheim & Covell

[57] ABSTRACT

The present invention relates to a process for treating a combustion reactant, such as fuel, for providing an efficient combustion of the reactant. The process includes applying an electrically polarizable material to a surface of a part of a fuel system for a combustion engine. Further, the process includes electrically polarizing the material applied on the surface for causing the material to become an electrically polarized electret. The process further includes contacting at least one reactant with the electrically polarized electret material prior to combustion of the reactant.

35 Claims, 1 Drawing Sheet

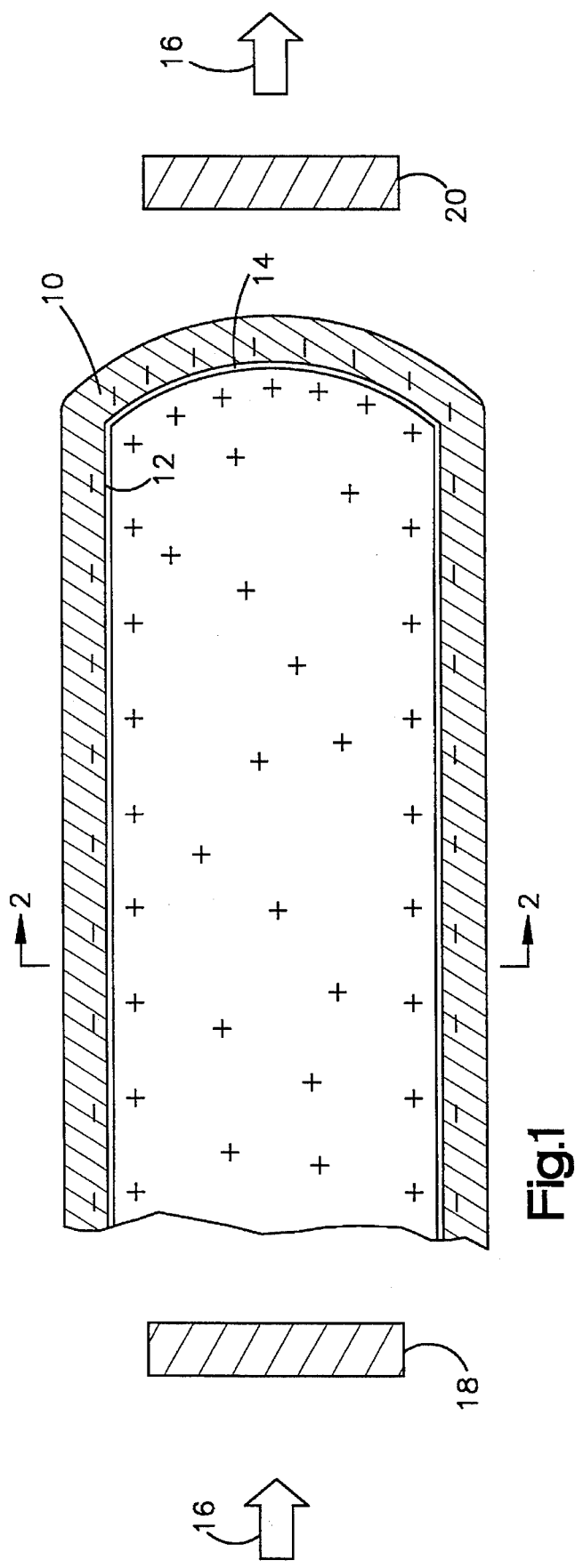

PROCESS AND APPARATUS FOR IMPROVED COMBUSTION OF FUELS WITH AIR

RELATED APPLICATIONS

This application is a continuation-in-part of application Ser. No. 07/635,189 having a U.S. filing date of Mar. 5, 1991 and entitled "Process and Apparatus for Improving the Combustion Process of Fuels With Gases Containing Oxygen and Process for the Production of Such an Apparatus", abandoned, and application Ser. No. 07/859,511 having a U.S. filing date of Jun. 8, 1992 and entitled "Process and Device for the Improvement of the Combustion Process of Fuels With Gases Containing Oxygen, as well as a Process to Manufacture Such a Device", also abandoned.

TECHNICAL FIELD OF THE INVENTION

The present invention relates to an improved process for the combustion of finely divided fuels with air. The present invention is particularly applicable to the combustion of gaseous or liquid fuels in internal combustion engines of vehicles. The present invention also relates to the manufacture of a device for carrying out the process of the present invention.

BACKGROUND OF THE INVENTION

Substantial efforts for the optimization of the combustion process are currently under way in the field of automotive engines. One objective in these efforts is a reduction in fuel consumption. Another objective is a reduction in environmental stress, for example, by the use of less lead and less benzene. A further objective is improvement in engine efficiency. Several solutions, which partially overlap each other, exist in order to attain these objectives. One solution for achieving an improvement in efficiency and/or reduction in fuel consumption is optimization of the combustion air path, for instance with the aid of four-valve engines and turbochargers. One solution for the reduction of contaminants is the utilization of a catalytic converter for the after-treatment of the combustion exhaust. Another solution is altering the fuel composition. A further solution is making the air/fuel mixture leaner. It has also been proposed to apply an electrical field to the fuel gas and air reactants. However, the effect of such application on the reactants, at the location of combustion, has proven to be insufficient, in practical applications.

SUMMARY OF THE INVENTION

The present invention relates to a process for treating a combustion reactant, such as fuel, for providing an efficient combustion of the reactant. The process includes applying an electrically polarizable material to a surface of a part of a fuel system for a combustion engine. Further, the process includes electrically polarizing the material applied on the surface for causing the material to become an electrically polarized electret. The process further includes contacting at least one reactant with the electrically polarized electret material prior to combustion of the reactant.

BRIEF DESCRIPTION OF THE DRAWINGS

The foregoing and other objects and features of the present invention will become more apparent upon consideration of the following description taken in connection with the accompanying drawings, wherein:

FIG. 1 is a section view taken along line 1—1 of FIG. 2 of a fuel system part, which has an electrically polarized electret material coating, directing a flow of a combustion reactant; and FIG. 2 is a section view taken along line 2—2 of FIG. 1.

DESCRIPTION OF PREFERRED EMBODIMENTS

The present invention is based on the objective of providing an improved process for treating reactants in a combustion process for improved combustion of the reactants. Specifically, the present invention provides the benefit of the influence of an electromagnetic field on a reactant in the combustion process.

With regard to the treatment process, the objective is obtained by electrically polarizing a material applied to a surface of a fuel part to provide an electrically polarized electret surface. At least one of the reactants of a combustion reaction is passed across the surface prior to combustion to reduce fuel consumption. This improved combustion is obtained by an increase in the reactivity of the reactant which is treated and/or improved homogeneity of the reaction mixture. By the present invention, particularly with respect to the combustion of fuels in internal combustion engines for motor vehicles, it is possible to reduce the contaminants in the exhaust gases and/or reduce fuel consumption, and/or improve the engine efficiency, particularly at partial load.

For purposes of the present application, the term "fuels" includes all finely divided fuels. Preferred fuels are liquid, vaporous and gaseous fuels, and combinations thereof. The present invention is also applicable to solid fine-particle fuels. The present invention can be used in all areas of combustion technology, especially fossil fuels, but also applies to synthetically manufactured fuels, which, for example, include power plant furnaces and similar applications. A particularly preferred field of use comprises internal combustion engines of any kind including water, land and air vehicles, and jet or rocket engines.

According to the present invention, the reactants can be treated together, which means before, during and/or after they have been mixed. The reactants or groups of reactants are preferably treated separately and, as a rule differently, preferably with opposite electrical polarities. In a particularly preferred example, the fuel, which can consist of a mixture of several materials, in particular several fuels, is treated separately from the combustion air, which may also be a gas mixture. It is sufficient to treat only one of the reactants, or group of reactants, in the manner suggested by the invention, for instance the fuel mixture on the one hand, or the combustion air mixture on the other hand.

The "surface" contacted by one or more of the reactants, during the treatment according to the present invention, can be any surface part of the combustion apparatus. The surface is contacted by at least one reactant immediately before the combustion. Preferred surface parts are the inner walls of transport channels through which at least one reactant flows, in passage to the combustion chamber. A surface part can also be a storage tank for a reactant. It can also be the combustion chamber. The only limitation is that the surface manufactured or treated according to the present invention can not be damaged by an external influence, such as an excessively high temperature. This means that the effect of a surface of the present invention on at least one reactant must remain and that the surface need not have to be serviced, other than infrequently.

A "contact" of at least one reactant with a surface according to the present invention can be direct or indirect. The individual molecules, or at least a portion of the molecules, of at least one reactant must either contact the surface or pass the same within a not excessively large distance from the surface. The reason for this is that the effect of a surface of the present invention on a reactant decreases with increasing distance from the surface. In the example of a fuel injection motor for a motor vehicle, it was found to be sufficient if the "contact" occurred between only one reactant and a portion of the surface within a transport channel, e.g., fuel line, leading to the combustion chamber. If the reactant being treated is combustion air, the treating surface by way of example can be an inner surface providing direct contact with the combustion air. If the reactant being treated is a liquid fuel, it is sufficient to use an external treating surface in the transport path, e.g. fuel line, providing an indirect contact. An indirect contact suffices as long as the structural element having the treating "contact" surface does not have a shielding effect.

The starting "material" utilized to form a treating surface according to the present invention is preferably in liquid form initially and is hardened to a more-or-less elastic or even relatively hard state by cooling or chemical reaction. The starting material can also be in a finely-divided or pulverized form. It will be understood that the starting material can be applied to a combustion apparatus part, as a surface of the part, or that the entire part can be produced from the material.

The material must have the ability to be electrically polarized and/or electrostatically charged, for instance by passing it through an electric field, or by friction. The ability to be electrically polarized means that a low charge displacement or charge orientation is possible in the atoms, molecules, or groups of molecules of the material. This includes orientation of entire molecules, particularly when exposed to a constant-voltage electrical field. By electrostatically charged, it is meant that the material carries a permanent net negative charge or net positive charge. Particularly suitable materials include a polymer plastic such as a polyorganosiloxane, polytetrafluoroethylene, a polyester, polypropylene, a condensed silicon resin, polymethysiloxane, polydimethylsiloxane, paraffin and the like. Preferred materials are a polyorganosiloxane and polydimethylsiloxane. The materials may be used alone or in combination as a mixture.

According to the present invention, care should be taken to ensure that the material, following electrical polarization, or charging, remain in a permanent electrically polarized and/or charged condition. The material can be electrically polarized and/or charged immediately before hardening, during hardening, or even after hardening. To electrically polarize and/or charge the material prior to hardening, the polarization or charging can be carried out either before the material is applied onto a surface, or during application onto a surface, or after application onto a surface. If an entire structural element is manufactured from the material, then the electrical polarization or charge of the material can take place during the manufacture, preferably prior to hardening. This means that the material can basically be left alone during the hardening step. However, it is usually desirable to maintain the electrical polarization and/or charge during the hardening step by application of suitable measures. The application of a constant-voltage electrical field to the material before and during hardening is particularly effective in producing and maintaining an electrically polarized and/or charged condition of the material. Such a constant-voltage field can basically be produced and applied in any arbitrary manner. For example, the surface of the construction part to be treated can be given an electrical positive or negative charge which is then maintained throughout hardening of the material applied to the construction part. Also, the structural element whose surface is to be treated can be placed in an electrical field, preferably without electrical conductive contact, and held in the field until the material applied to the part hardens. It is basically sufficient if the constant-voltage electrical field is designed in such a way that the material to be hardened is electrically polarized and/or charged before and/or during the hardening step.

Constant-voltage electrical fields of a few kV, for example between 1 and 10 kV, can be used. Fields between 10 and 100 kV are preferred. Electrical fields of over 100 kV can be proper in some cases.

As an alternative to this procedure, the electrical polarization and/or maintaining the polarized condition may be omitted if the solidified material can be electrically charged and/or polarized by friction, for example, by passing a flow of air (one of the reactants) over the material. Even in this instance, it is preferred if a constant-voltage electrical field acts upon the material during the hardening, or at least immediately before the hardening of the material.

The thickness of the material layer on a surface can be relatively small, for instance, between 0.01 and 100 μm. However, thicker layers of, for example, 0.1 to 10 mm, preferably about 1 mm have been successfully used. The thickness of the layer does not have to be constant. The material coating on a part is preferably continuous, but this is not necessary. The demands set forth for thickness, evenness and completeness of the material application onto a part depends upon the conditions of the individual processes. These demands will usually become less stringent with more intensive contact between the surface and at least one reactant.

Particularly intensive contacts occur in air filters, air filter housings, on valves and/or fuel injection jets and similar circulatory contact surfaces upstream or immediately before or in the combustion chamber of internal combustion engines.

The air intake channels and/or the fuel lines can be coiled for further improvement of the process. The forced movement of air and fuel obtained by the use of a helical channel or fuel line ensures a maximum contact of the air and fuel with the surfaces of the channel and fuel line coated with the material of the present invention.

At a reduction of the fuel consumption by X%, the emission of exhaust gases is reduced by more than the fuel saved that is otherwise subsequently combusted in the catalytic converter.

Honeycombed screen structures, in particular, arranged in the intake flow of the combustion air, are particularly suitable for the utilization of surfaces according to the present invention, since they offer large surfaces with minute flow resistance.

In any case, it is advantageous if the treating point of at least one of the reactants, that is the surface according to the present invention, is located as close as possible to the combustion chamber. This means that the path to be travelled to the combustion chamber from the treatment point be as short as possible, or that the time for the travel of the reactant from the treatment point to the combustion chamber be as short as possible. An alternative is to provide electrically non-conductive walls in the path between the point of treatment and the combustion chamber.

The aforementioned structural elements or production steps according to the present invention are not subject to any special limitations in regard to their size, form, material selection and technical concepts, so that known selective criteria for the particular application area can be employed without limitation.

As illustrative of the process of the present invention, FIGS. 1 and 2 show a fuel system part 10 with an inner surface 12. The inner surface 12 is coated with a dielectric material 14. The dielectric material 14 has a permanent state of electric polarization indicated by charge signs "+" and "−". Thus, the dielectric material 14 is an electret. A flow of a reactant 16 passes through the fuel system part 10. As the reactant 16 passes through the fuel system part 10, the reactant 16 contacts and passes across the dielectric material 14.

Preferably, the reactant 16 passes through a device 18 for imparting turbulence to the reactant. Such turbulence increases the intensity of contact between the reactant 16 and the material 14. One suitable device is a honeycomb structure or vortex tube placed in the path of the intake air flow. A function of a vortex tube would be to also cool the reactant. Cooling a reactant treated according to the present invention was found to have a beneficial effect on engine efficiency.

It will also be understood by those skilled in the art that the fuel system part 10 itself can be suitably configured to increase the intensity of the contact between the part and the reactant 16, for instance by shaping the part 10 in the form of a coiled line or helix. It will also be understood that the FIGS. 1 and 2 are schematic representations only, and can represent any part of an engine fuel or air intake system, for instance an air filter housing, a valve, a fuel injection jet or a fuel line. The configuration of such parts are well known and not part of the present invention.

If desired, the apparatus of the present invention can also comprise a device 20 in the reactant flow path downstream of the part 10. The device 20 imparts turbulence to the reactant 16 which increases the efficiency of the reaction between the reactant 16 and the co-reactant in the combustion process.

The following Examples illustrate the present invention.

EXAMPLE 1

In an internal combustion engine for motor vehicles with fuel injection, the inner surface of the combustion air filter housing was treated in the following manner, with the engine running. A solution of polydimethylsiloxane was diluted with a solvent consisting of trichloroethylene. The solution of the polydimethylsiloxane is a rapidly-vulcanizing one-component solution. The diluted solution was sprayed in an approximately tangential direction, with compressed air as a propellant, over a copper plate that was electrically charged with 28 kV in a positive manner. The plate had a size of 0.2×0.3 meters. The copper plate was positioned so that the sprayed solution reached the air filter housing of the internal combustion engine after passing the copper plate. The sprayed material hardened rapidly. This allowed the internal combustion engine, following treatment, to be re-started immediately. A reduction in fuel consumption was achieved amounting to more than 20%. In addition to this, an improvement in acceleration at partial load was obtained.

Supplemental experiments indicated that supplemental treatment of the engine fuel lines with the same polydimethylsiloxane led to further reduction in the fuel consumption. The supplemental experiments were executed with the same experimental arrangement and under the same experimental conditions, but the copper plate was electrically charged in a negative manner.

It was surprisingly determined that a reduction of the fuel consumption could also be obtained if the fuel did not directly contact the treated surface of the present invention, but only had an indirect contact. The outer surface of the fuel line was treated with the material of the present invention. The fuel line in this instance was non-metallic. This demonstrated that the contact of a reactant with the surfaces treated according to the present invention need not necessarily be direct. Rather, it suffices if the distance between the surfaces treated according to the present invention and the passing reactant is relatively minute, approximately in the range of a few mm. Naturally, the less the distance from a surface and the more direct and intensive the contact, the better the effect.

EXAMPLE 2

The same experiment as in Example 1 was repeated with another commercial material that had good dielectric properties. This material was a mixture of 2% by volume dimethylsiloxane and 98% by volume paraffin. The mixture before hardening, dissolved in carbon tetrachloride, and had a solids content of 89.7% by volume. The results obtained with this material were similarly good as those of Example 1.

EXAMPLE 3

A second series of experiments were carried out in the same manner as in Example 1, but with the following difference. A copper plate was electrically charged in a positive manner and had a size of 0.4×0.3 meters. The plate was positioned with an edge as close as possible to an opening of the filter housing. A dielectric material was positioned between the plate and the filter to prevent a spark discharge. The coating material of the present invention was sprayed into the filter housing by means of compressed air. The flow of the coating material was in a plane parallel to the orientation of the plate, but within the electric field of the plate. The treatment was continued with the internal combustion engine running until excess coating material was discharged with emission gases. A permanent electrical field with a high level of charge of approximately 20 kV was obtained on the treated surfaces. In this Example, the coating material was similar to the silicone based material used in Example 1 (with good wettability on smooth surfaces). The solvent (50%) was a petroleum fraction having a boiling range of 150°–200° C. The crosslinking speed of this material was slower than the crosslinking speed of the material utilized in Example 1.

The material utilized in Example 1, as well as in this Example, was a self-crosslinking coating material that forms a film. The flash point of the material utilized in this Example was approximately 38° C. before spraying, while in the hardened state was resistant to heat up to above 200° C. and more. The internal combustion engine which was running during the coating process was set up in an entirely electrically insulated manner, which represents the preferred arrangement.

Long-term tests with an internal combustion engine treated in the aforementioned manner showed substantial reductions in the fuel consumption, as well as substantial increases in the efficiency, whereby the coating according to the present invention did not have to be renewed, even after very long operation times of the engine. The coating on the coated elements was confirmed optically and chemically and had a permanent electrical field of approximately 20 kV.

Based on the results of these experiments, one has to assume that a reduction of the quantity of fuel injected at a certain set rotation speed still provides a certain increase in efficiency, so that it seems advantageous to operate the internal combustion engine with particularly large quantities of combustion air and particularly minute quantities of fuel. In addition to this, it was established that even better results with regard to efficiency were obtained with relatively cold combustion air, which is the reason why the utilization of cold combustion air or the production of cold combustion air is preferred for the operation of the internal combustion treated according to the invention. The application of the present invention to airplane engines is thus considered as particularly advantageous. It is particularly preferred to construct one or more surfaces as an electret.

It was finally established that an insulating coating of the outer surface of insulated fuel lines, in particular with the starting materials mentioned in the Examples, is particularly advantageous, namely because of the application of electrical fields.

Having described the present invention, the following is claimed:

1. A process for treating combustion reactants for providing an efficient combustion of the reactants, said process comprising the steps of:

applying an electrically polarizable material to a surface of part of a fuel system for an internal combustion engine wherein said surface is one of an inner surface of an air filter housing, a surface of a valve a surface of a fuel injection jet, and combinations thereof;

electrically polarizing the electrically polarizable material causing the electrically polarizable material to become an electrically polarized electret material; and contacting at least one of said reactants with said electrically polarized electret material prior to combustion of the reactants.

2. A process according to claim 1 further including the step of conveying the electrically polarizable material through an electrical field prior to said step of applying the electrically polarizable material to said surface.

3. A process according to claim 1 wherein the step of applying the electrically polarizable material to said surface comprises spraying the electrically polarizable material into an air intake section of an internal combustion engine while the engine is running.

4. A process according to claim 3 wherein the electrically polarizable material is sprayed into the internal combustion engine until excess components of the electrically polarizable materials are detected in an emission gas of the internal combustion engine.

5. The process according to claim 4 wherein the step of polarizing the electrically polarizable material occurs prior to or during hardening of the electrically polarizable material.

6. A process according to claim 1 wherein said part of the fuel system is electrically insulating.

7. A process according to claim 1 further including the step of cooling at least one of the reactants prior to said step of contacting said at least one reactant with the electrically polarized electret material.

8. A process according to claim 7 wherein said cooled reactant is combustion air.

9. A process according to claim 7 wherein a vortex tube is utilized for said step of cooling.

10. A process according to claim 1 further including the step of providing a spin to at least one of the reactants prior to, during or after said step of contacting said at least one reactant with the electrically polarized electret material.

11. A process according to claim 1 wherein said step of electrically polarizing the electrically polarizable material occurs by utilizing an electrically conductive charged plate adjacent said electrically polarizable material and wherein the electrically conductive plate is located a sufficiently large distance away from said electrically polarized surface to minimize an electrical spark discharge.

12. A process accordingly to claim 1 wherein the electrically polarizable material is selected from a group consisting of a polyorganosiloxane, polytetrafluoroethylene, a polyester, polypropylene, a condensed silicone resin, polymethylsiloxane, polydimethylsiloxane, paraffin and mixtures thereof.

13. A process according to claim 12 wherein the electrically polarizable material includes a solvent selected from the group consisting of trichloroethylene, crystal oil, benzene fractions or combinations thereof.

14. A process according to claim 1 wherein one of the reactants is a finely divided fuel reactant selected from the group consisting of solid fine-particle fuels, a finely divided liquid fuel, a gaseous or vaporous fuel, and mixtures thereof.

15. A process according to claim 14 wherein said fuel is a fossil fuel, a synthetic fuel, or a mixture thereof.

16. A process for treating a combustion reactant for improved combustion efficiency comprising the steps of:

(a) providing a part having a material surface contactable by said reactant prior to combustion of the reactant wherein said reactant is a fuel, an oxygen containing gas, or both;

(b) electrically polarizing or charging the material of said material surface resulting in an electrically polarized or charged material surface wherein said material surface is a coating; and (c) contacting said reactant with said part.

17. The process of claim 16 wherein said contact is direct.

18. The process of claim 17 wherein said contact is turbulent.

19. The process of claim 16 wherein said coating is a hardenable coating composition applied to said part in a fluid state, and is electrically polarized or charged prior to hardening.

20. The process of claim 16 wherein said coating composition is electrically polarized or charged in an electric direct current voltage field prior to or during application to said part.

21. The process as set forth in claim 20 wherein the voltage of said direct current is at least 1 kV.

22. The process of claim 16 wherein said material is a plastic polymer.

23. The process as set forth in claim 22 wherein said material is selected from the group consisting of a polyorganosiloxane, polytetrafluoroethylene, a polyester, polypropylene, a condensed silicone resin, polymethylsiloxane, polydimethylsiloxane, paraffin and mixtures thereof.

24. The process of claim 22 wherein said polymer is permanently polymerized and/or charged.

25. The process as set forth in claim 16 for the combustion of a first reactant with a second reactant comprising the steps of (a) contacting said first reactant with a first material surface, (b) contacting said second reactant with a second material surface, wherein the first material surface is polarized opposite the second material surface.

26. An apparatus for improving the combustion of reactants including a fuel reactant and a gas reactant containing oxygen, said apparatus comprising:

a combustion apparatus part for contacting one of said reactants prior to combustion of the reactants; and said part comprising a material in an electrically polarized or charged condition wherein said material is a coating applied to said part.

27. An apparatus according to claim 26 comprising a first part comprising a first material for contacting said fuel reactant and a second part comprising a second material for contacting said gas reactant, said first and second materials being oppositely polarized or charged.

28. An apparatus according to claim 26 wherein said material is a hardenable coating composition applied to said part in a fluid condition, said polarization or charging occurring prior to or during hardening.

29. An apparatus according to claim 26 wherein the contact between said coating and said reactant is direct.

30. An apparatus according to claim 29 including means for imparting turbulence to said reactant prior to the contact of said coating and reactant.

31. The apparatus according to claim 26 including means for cooling said reactant.

32. The apparatus of claim 26 wherein said material is selected from the group consisting of a polyorganosiloxane, polytetrafluoroethylene, a polyester, polypropylene, condensed silicone resin, polymethylsiloxane, polydimethylsiloxane, paraffin and mixtures thereof.

33. A process for treating combustion reactants as set forth in claim 30 for providing an efficient combustion of the reactants comprising treating at least one of the reactants with the apparatus.

34. A process for the treatment of reactants wherein one of said reactants is a fuel and a second of said reactants is a gas containing oxygen, comprising the steps of:

(a) applying a first material to a first surface wherein there is more than one surface;

(b) electrically polarizing said first material on said first surface resulting in an electrically polarized first surface and hardening the first material;

(c) contacting a first reactant with said hardened first surface, said first surface imparting to said first reactant a charge of one sign;

(d) applying a second material to a second surface;

(e) electrically polarizing said second material on said second surface resulting in an electrically polarized surface and hardening the second material, the second material having a polarity opposite that of the first material on said first surface; and (f) contacting a second reactant with said second surface, said second surface imparting to said second reactant a charge of opposite sign to said first reactant.

35. The process of claim 34 wherein at least one of said first and second materials is a mixture of dimethylsiloxane and paraffin.

* * * * *

UNITED STATES PATENT AND TRADEMARK OFFICE
CERTIFICATE OF CORRECTION

PATENT NO. : 5,507,267
DATED : April 16, 1996
INVENTOR(S) : Willy Stuer

It is certified that error appears in the above-indentified patent and that said Letters Patent is hereby corrected as shown below:

Column 10, line 4 change "30" to --26--.

Signed and Sealed this

Seventeenth Day of September, 1996

Attest:

BRUCE LEHMAN

*Attesting Officer*  *Commissioner of Patents and Trademarks*